No. 869,662. PATENTED OCT. 29, 1907.
C. F. SNYDER.
HOSE OR PIPE COUPLING.
APPLICATION FILED SEPT. 15, 1906.
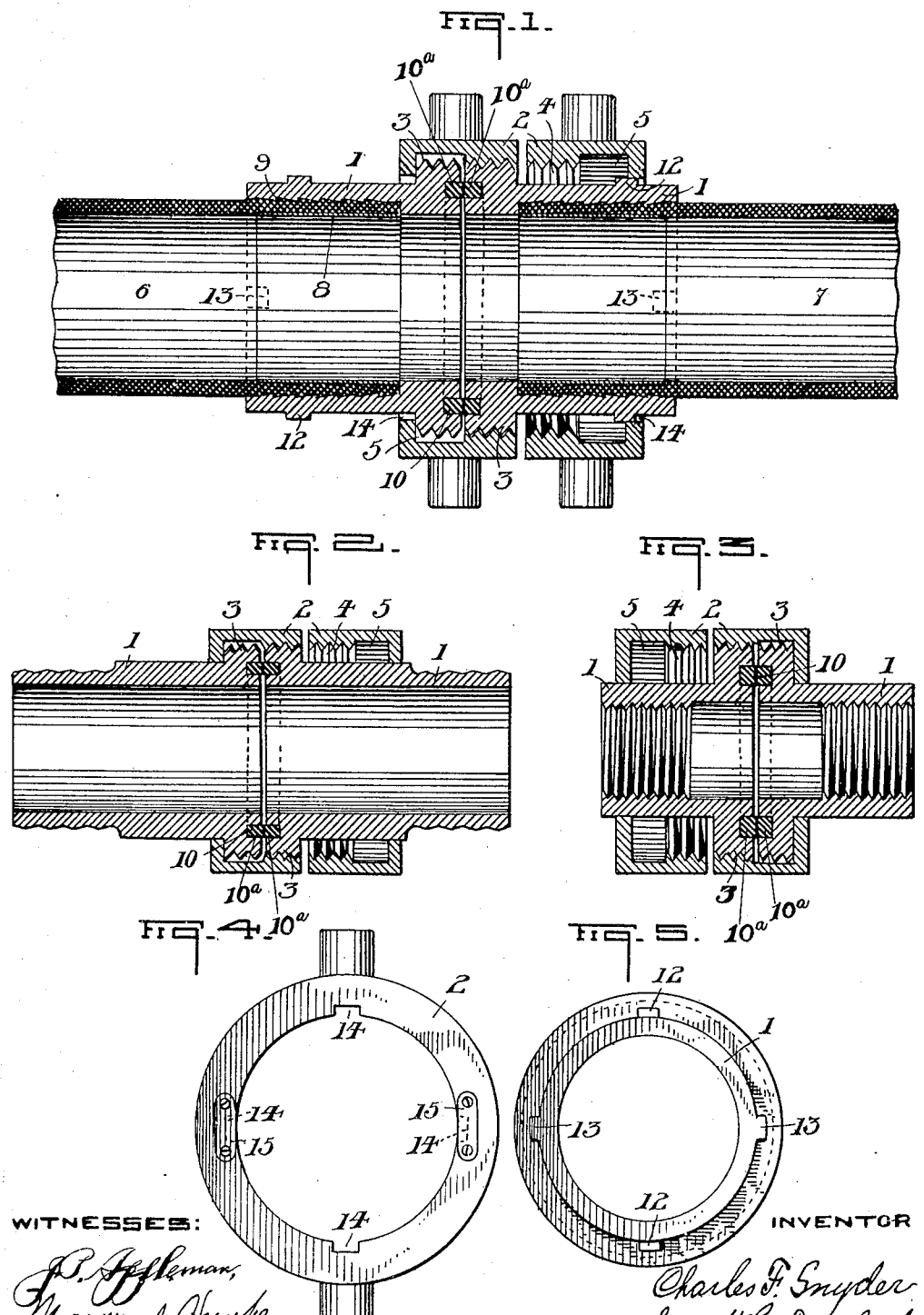
WITNESSES: INVENTOR
Charles F. Snyder
by W. J. Doolittle
ATTORNEY

UNITED STATES PATENT OFFICE.

CHARLES F. SNYDER, OF ALLEGHENY, PENNSYLVANIA, ASSIGNOR OF ONE-EIGHTH TO JOHN P. MURRAY, OF ALLEGHENY, PENNSYLVANIA.

HOSE OR PIPE COUPLING.

No. 869,662.     Specification of Letters Patent.     Patented Oct. 29, 1907.

Application filed September 15, 1906. Serial No. 334,721.

*To all whom it may concern:*

Be it known that I, CHARLES F. SNYDER, of Allegheny, in the county of Allegheny and State of Pennsylvania, have invented certain new and useful Improvements in Hose or Pipe Couplings, of which the following is a specification.

The object of my invention is to provide a new and improved hose or pipe-coupling and to this end the present invention consists, in a hose or pipe-coupling, in the novel features of construction, and in the combination of parts all as fully hereinafter described and claimed.

In the accompanying drawing, which illustrates applications of my invention, Figure 1 is a central longitudinal sectional view of a fire-hose coupling embodying my invention; Fig. 2, a similar view of a modified form, particularly designed for a small hose-coupling; Fig. 3, a central longitudinal sectional view of a form of pipe-coupling; Fig. 4, a detail end view of the form of Fig. 1; and Fig. 5, a detail end view of shank showing lugs.

Referring to the drawing, the coupling, as illustrated and as preferred, consists of two substantially similar members or ends each comprising a shank 1 and a movable sleeve or nut 2. The shank of each part is formed with an externally threaded portion 3, adapted to coöperate with the nuts to form a union. Each of the nuts is formed with an internally threaded portion 4 and with an annular recess or counterbore 5.

In the form of Fig. 1, 6 and 7 designate end portions of fire-hose sections which are securely attached to the shanks of the coupling by means of expanded rings 8. To aid in gripping the hose the interior of each shank is beaded as shown at 9. 10 designate two gaskets each being set into an annular groove or pocket 10ª formed in the flanged or collar portions of the respective shanks. This construction provides a metallic body entirely surrounding and protecting the gaskets; the gaskets are out of the path of the pressure of the water, and dirt and other foreign matter cannot work in behind the gaskets as is the case in hose or pipe-couplings as heretofore constructed.

The characteristic and important features of my invention are the shanks and coöperating nuts or sleeves. By the employment of the construction shown I provide a simple and efficient hose or pipe-coupling having two substantially similar members capable of being readily united to form a secure union. As illustrated, the length of the threaded portion of the nuts is the same as the threaded portion of the shanks and the recess or counterbore formed in the nuts corresponds in length to the said threaded portions of the nuts or shanks. When a union is made a nut of one member is in engagement with the threaded portion of the shank of the opposite member, and the threaded portion of the latter member is located in and protected by the annular recess or counterbore of the nut. The recess or counterbore is also utilized to protect the threaded portions of the shanks while the members are unassembled.

The form of coupling shown by Fig. 1 is particularly designed for fire-hose and it is of the utmost importance that a coupling employed for this purpose should be of such a nature that the members may be quickly and effectively coupled together. In order to accomplish this, I form on each shank two sets of lugs 12 and 13, the lugs 12 are placed in advance of the lugs 13 and are adapted to enter the openings 14 formed in the nuts. This construction prevents the idle nut from turning on its shank during the act of coupling the members and very materially aids in the operation. The function of the set of lugs 13 coöperating with the removable plates 15, is to prevent the idle nut from being forced back free of its shank. The plates 15 are secured to the outer face of the nut over two of the openings 14 after the nut is placed upon its shank.

What I claim is:

A hose or pipe-coupling consisting of two substantially similar members, each member comprising a shank formed with an externally threaded flange having an annular-groove and provided with two sets of lugs one set being in advance of the other, a gasket located in the groove, a nut formed with an internally threaded portion and an annular recess and provided with openings to receive the two sets of lugs, and plates adapted to be secured to the nuts over two of the openings, substantially as set forth.

In testimony whereof I affix my signature in presence of two witnesses.

CHARLES F. SNYDER.

Witnesses:
   JOHN P. MURRAY,
   WM. A. MINEELY.